United States Patent
Borella et al.

(10) Patent No.: US 9,399,696 B2
(45) Date of Patent: Jul. 26, 2016

(54) TIN FREE POLYMER POLYOLS

(71) Applicants: Ricco B. Borella, Schindellegi (CH);
Paul Cookson, Schindellegi (CH);
Daniel Hoehener, Horgen (CH);
Francois M. Casati, Pfaffikon (CH)

(72) Inventors: Ricco B. Borella, Schindellegi (CH);
Paul Cookson, Schindellegi (CH);
Daniel Hoehener, Horgen (CH);
Francois M. Casati, Pfaffikon (CH)

(73) Assignee: Dow Global Technologies LLC, Midland, MI (US)

( * ) Notice: Subject to any disclaimer, the term of this patent is extended or adjusted under 35 U.S.C. 154(b) by 73 days.

(21) Appl. No.: 14/378,189

(22) PCT Filed: Mar. 14, 2013

(86) PCT No.: PCT/US2013/031403
§ 371 (c)(1),
(2) Date: Aug. 12, 2014

(87) PCT Pub. No.: WO2013/148252
PCT Pub. Date: Oct. 3, 2013

(65) Prior Publication Data
US 2015/0038653 A1 Feb. 5, 2015

Related U.S. Application Data

(60) Provisional application No. 61/618,085, filed on Mar. 30, 2012.

(51) Int. Cl.
*C08G 18/76* (2006.01)
*C08G 18/22* (2006.01)
*C08G 18/48* (2006.01)
*C08G 18/24* (2006.01)
*C08G 18/32* (2006.01)
*C08G 18/40* (2006.01)

(52) U.S. Cl.
CPC .......... *C08G 18/7621* (2013.01); *C08G 18/222* (2013.01); *C08G 18/242* (2013.01); *C08G 18/3281* (2013.01); *C08G 18/409* (2013.01); *C08G 18/4829* (2013.01)

(58) Field of Classification Search
USPC ......................................................... 525/429
See application file for complete search history.

(56) References Cited

U.S. PATENT DOCUMENTS

| | | | |
|---|---|---|---|
| 4,374,209 A | 2/1983 | Rowlands et al. | |
| 4,452,923 A | 6/1984 | Carroll et al. | |
| 4,497,913 A * | 2/1985 | Raes ............... | C08G 18/0876 521/137 |
| 4,506,040 A * | 3/1985 | Raes ............... | C08G 18/0871 252/182.27 |
| 4,785,026 A | 11/1988 | Yeakey et al. | |
| 5,068,280 A * | 11/1991 | Pal ................... | C08G 18/0876 252/182.27 |
| 5,292,778 A * | 3/1994 | Van Veen .......... | C08G 18/3271 521/126 |
| 6,881,783 B1 * | 4/2005 | Verhelst ........... | C08G 18/0876 252/182.27 |
| 2006/0058410 A1 | 3/2006 | Yu et al. | |
| 2007/0185223 A1 * | 8/2007 | Ortalda ............. | C08G 18/227 521/172 |
| 2007/0238796 A1 | 10/2007 | Lovenich et al. | |
| 2010/0069518 A1 | 3/2010 | Mispreuve et al. | |
| 2010/0286299 A1 | 11/2010 | Casati et al. | |
| 2012/0101181 A1 | 4/2012 | Munshi et al. | |
| 2014/0051778 A1 | 2/2014 | Cookson et al. | |
| 2014/0051779 A1 | 2/2014 | Casati et al. | |

FOREIGN PATENT DOCUMENTS

WO 9420558 A1 9/1994

OTHER PUBLICATIONS

PCT/US2013/031403, International Search Report and Written Opinion of the International Searching Authority Mailed Jul. 29, 2013.
PCT/US2013/031403, International Preliminary Report on Patentability, Mailed Oct. 1, 2014.

* cited by examiner

*Primary Examiner* — Randy Gulakowski
*Assistant Examiner* — Christopher M Rodd

(57) ABSTRACT

Embodiments include polymer polyol dispersions which include a polyol liquid phase and solid particle phase. Embodiments include methods of making the polymer polyol dispersions. The polymer polyol dispersions are essentially free of tin, have a solid content of between about 20 and 50 wt % based on the total weight of the polymer polyol dispersion, and have a viscosity at 20 C. of less than 9000 mPas. The solid particle phase has more than 90% by weight of particles in the solid particle phase having a particle diameter of less than 5 μm.

16 Claims, No Drawings

TIN FREE POLYMER POLYOLS

FIELD OF THE INVENTION

Embodiments of the invention relate to polyols, more specifically to polymer polyols.

BACKGROUND OF THE INVENTION

Polyurethane foams are produced by the reaction of polyisocyanates and polyols in the presence of a blowing agent. In order to improve load-bearing and other foam properties, so-called polymer polyol products have been developed. A common type of polymer polyol is a dispersion of vinyl polymer particles in a polyol. Examples of vinyl polymer particle polyols include so-called "SAN" polyols, which are dispersions of styrene-acrylonitrile. Other common types of polymer polyols are so-called "PHD" polyols (dispersions of polyurea particles) and so-called "PIPA" (polyisocyanate polyaddition) polyols (dispersions of polyurethane and/or polyurethane-urea particles). PIPA and PHD particles may be produced by introducing the appropriate co-reactant or co-reactants into a polyol or polyol blend and reacting the co-reactant(s) with a polyisocyanate in order to polymerize the co-reactant(s) in the presence of a tin salt catalyst such as for example stannous octoate, dimethyltin, and dibutyltin catalysts. However, there is a desire to reduce the use of tin based catalysts.

Therefore, there is a need for polymer polyols made with using less tin based catalysts, or without any tin based catalyst.

SUMMARY OF THE INVENTION

Embodiments of the invention provide for polymer polyols made with using low amounts of tin based catalysts, or without any tin based catalyst.

Embodiments include polymer polyol dispersions which include a polyol liquid phase and solid particle phase. The polymer polyol dispersions are essentially free of tin, have a solid content of between about 20 and 50 wt % based on the total weight of the polymer polyol dispersion, and have a viscosity at 20° C. of less than 9000 mPas. The solid particle phase has more than 90% by weight of particles in the solid particle phase having a particle diameter of less than 5 μm.

In one embodiment, a method of producing a polymer polyol dispersion is provided. The method includes
1) in a first step, a) combining at least one of a tin-free catalyst, at least one of a polyol, and at least one of a co-reactant, wherein the co-reactant has an equivalent weight of up to 400 and at least one active hydrogen attached to a nitrogen or oxygen atom, and b) introducing at least one polyisocyanate to create a polymer polyol having a first solid content; and
2) in a second step, a) introducing at least one of a co-reactant to the polymer polyol, wherein the co-reactant has an equivalent weight of up to 400 and at least one active hydrogen attached to a nitrogen or oxygen atom, b) introducing at least one polyisocyanate to create a polymer polyol having a second solid content.

DESCRIPTION OF EMBODIMENTS OF THE INVENTION

Embodiments of the present invention provide for a polymer polyol blend which includes PIPA and/or PHD particles which have been formed in situ in the polyol blend. The polymer polyol blend may have a solid content of between about 15% and about 40% of the weight of the polymer polyol blend. Such high solid content may be obtained while maintaining small particle sizes. For example, in one embodiment, at least 90% by volume of the particles have particle diameters of less than 10 μm. The in-situ formation of the PIPA and/or PHD particles of the polymer polyol blend may be formed without the addition of any catalyst comprising tin, so that the polymer polyol blend may have a very low amount of tin, if any at all, present.

The polyol blend may include any kind of polyol that is known in the art and include those described herein and any other commercially available polyol. Mixtures of one or more polyols may also be used to produce the polymer polyols according to the present invention.

Representative polyols include polyether polyols, polyester polyols, polyhydroxy-terminated acetal resins, hydroxyl-terminated amines. Alternative polyols that may be used include polyalkylene carbonate-based polyols and polyphosphate-based polyols.

Embodiments encompass polyether polyols prepared by adding an alkylene oxide, such as ethylene oxide, propylene oxide, butylene oxide or a combination thereof, to an initiator having from 2 to 8, such as, for example, 2 to 6 active hydrogen atoms. Catalysis for this polymerization can be either anionic or cationic, with catalysts such as KOH, CsOH, boron trifluoride, or a double metal cyanide complex (DMC) catalyst such as zinc hexacyanocobaltate or quaternary phosphazenium compound.

Examples of suitable initiator molecules are water, organic dicarboxylic acids, such as succinic acid, adipic acid, phthalic acid and terephthalic acid; and polyhydric, in particular dihydric to octohydric alcohols or dialkylene glycols.

Exemplary polyol initiators include, for example, ethanediol, 1,2- and 1,3-propanediol, diethylene glycol, dipropylene glycol, 1,4-butanediol, 1,6-hexanediol, glycerol, pentaerythritol, sorbitol, sucrose, neopentylglycol; 1,2-propylene glycol; trimethylolpropane; glycerol; 1,6-hexanediol; 2,5-hexanediol; 1,4-butanediol; 1,4-cyclohexane diol; ethylene glycol; diethylene glycol; triethylene glycol; 9(1)-hydroxymethyloctadecanol, 1,4-bishydroxymethylcyclohexane; 8,8-bis(hydroxymethyl)tricyclo[5,2,1,0$^{2,6}$]decene; Dimerol alcohol (36 carbon diol available from Henkel Corporation); hydrogenated bisphenol; 9,9(10,10)-bishydroxymethyloctadecanol; castor oil; epoxidized seed oil; other modified seed oils containing reactive hydrogens; 1,2,6-hexanetriol; and combination thereof.

The polyols may for example be poly(propylene oxide) homopolymers, random copolymers of propylene oxide and ethylene oxide in which the poly(ethylene oxide) content is, for example, from about 1 to about 30% by weight, ethylene oxide-capped poly(propylene oxide) polymers and ethylene oxide-capped random copolymers of propylene oxide and ethylene oxide. For slabstock foam applications, such polyethers may contain 2-5, especially 2-4, or from 2-3, mainly secondary hydroxyl groups per molecule and have an equivalent weight per hydroxyl group of from about 400 to about 3000, especially from about 800 to about 1750. For high resiliency slabstock and molded foam applications, such polyethers may contain 2-6, or 2-4, mainly primary hydroxyl groups per molecule and have an equivalent weight per hydroxyl group of from about 1000 to about 3000, especially from about 1200 to about 2000. When blends of polyols are used, the nominal average functionality (number of hydroxyl groups per molecule) will be preferably in the ranges specified above. For viscoelastic foams shorter chain polyols with hydroxyl numbers above 150 are also used. For the production of semi-rigid foams, it is preferred to use a trifunctional polyol with a hydroxyl number of 30 to 80.

The polyether polyols may contain low terminal unsaturation (for example, less that 0.02 meq/g or less than 0.01 meq/g), such as those made using so-called double metal cyanide (DMC) catalysts or may have an unsaturation higher than 0.02 meq/g, provided it is below 0.1 meq/g. Polyester polyols typically contain about 2 hydroxyl groups per molecule and have an equivalent weight per hydroxyl group of about 400-1500.

PIPA and/or PHD particles which are formed in situ in the polyol blend are the reaction product of at least one of a co-reactant and at least one polyisocyanate.

The at least one of a co-reactant may have an equivalent weight of up to 400 and at least one active hydrogen attached to a nitrogen or oxygen atom.

If PHD particles are desired, PHD forming co-reactants may include amines, such as ammonia, anilines and substituted anilines, and fatty amines. The PHD forming co-reactants may also include diamines, such as ethylenediamine, 1,6-hexamethylenediamine, alkanolamines, and hydrazine.

If PIPA particles are desired, PIPA forming co-reactants may include include diols, triols, tetrols, or higher functionality alcohols, such as glycol, glycerol, quadrol, polyglycerine; and alkanolamines, such as monoethanolamine, diethanolamine, triethanolamine, triisopropanolamine, 2-(2-aminoethoxyethanol), hydroxyethylpiperazine, monoisopropanolamine, diisopropanolamine and mixtures thereof. Other alkanolamines which may be considered include N-methylethanolamine, phenylethanolamine, and glycol amine. It is also possible to provide a mixture of PHD and PIPA forming co-reactants to form hybrid PHD-PIPA particles.

The at least one polyisocyanate may be aromatic or aliphatic. Examples of suitable aromatic polyisocyanates include the 4,4'-, 2,4' and 2,2'-isomers of diphenylmethane diisocyante (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimehtyldiphenyl, 3-methyldiphenyl-methane-4,4'-diisocyanate and diphenyletherdiisocyanate and 2,4,6-triisocyanatotoluene and 2,4,4'-triisocyanatodiphenylether.

Mixtures of polyisocyanates may be used, such as the commercially available mixtures of 2,4- and 2,6-isomers of toluene diisocyantes. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used.

Examples of aliphatic polyisocyanates include ethylene diisocyanate, 1,6-hexamethylene diisocyanate, isophorone diisocyanate, cyclohexane 1,4-diisocyanate, 4,4'-dicyclohexylmethane diisocyanate, saturated analogues of the above mentioned aromatic isocyanates and mixtures thereof.

The at least one polyisocyanate may be used at an isocyanate index of between about 30 and about 150, such as between about 50 and about 120, between about 60 and about 110, or between 60 and 90. The isocyante index may be kept below 100 to keep PIPA and/or PHD forming co-reactant present in the polymer seeds. The isocyanate index is the ratio of isocyanate-groups over isocyanate-reactive hydrogen atoms present in a formulation. Thus, the isocyanate index expresses the percentage of isocyanate actually used in a formulation with respect to the amount of isocyanate theoretically required for reacting with the amount of isocyanate-reactive hydrogen used in a formulation.

PIPA and/or PHD particles which are formed in situ in the polyol blend may be formed in the presence of a catalyst. Catalytic quantities of organometallics may be used. Organometallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, chromium, etc. Some examples of these metal catalysts include bismuth nitrate, bismuth neodecanoate, lead 2-ethylhexoate, lead benzoate, lead oleate, dibutyltin dilaurate, tributyltin, butyltin trichloride, dimethyltin stannic chloride, stannous octoate, stannous oleate, dibutyltin di-(2-ethylhexoate), ferric chloride, antimony trichloride, antimony glycolate, tin glycolates, iron acetyl acetonate etc. The catalyst is used to accelerate the reaction of isocyanate with the co-reactant, such as the hydroxyl or secondary or primary amine groups of the alkanolamines or the primary or secondary amines groups of the amine based co-reactant. In certain embodiments, catalysts not comprising tin are used.

Embodiments also include using tertiary amine catalysts such as DABCO 33 LV (a 1,4-diazabicyclo[2.2.2]octane or triethylenediamine) or POLYCAT 77 (a bis-(dimethylaminopropyl)methylamine) as co-catalyst in addition to the metal catalyst. Embodiments also include tin-free catalyst such as metal salt catalysts based on a fatty acid, such as KOSMOS EF (a stannous ricinoleate); KOSMOS 54 (a a zinc ricinoleate), zinc octoate, or DABCO MB20 (bismuth neodecanoate). In some embodiments, a combination of tertiary amine catalysts and metal salt catalysts based on a fatty acid is used.

In embodiments of the invention, the metal salt catalyst is pre-blended with the co-reactant (the amine and/or aminoalcohol) used to produce the PHD or PIPA seed particles, and the amine catalyst is pre-blended with the carrier polyol.

In certain embodiments, the polymer polyol dispersion may be made in at least two steps. The first step may include a) combining at least one of the tin-free catalyst, at least one of the polyol, and at least one of the co-reactant, and b) introducing the least one polyisocyanate to create a polymer polyol having a first solid content. The first solid content may be between 2 and 15 wt. % of the total weight of the polymer polyol having a first solid content. All individual values and subranges between 1 wt. % and 15 wt. % are included herein and disclosed herein; for example, the solid content may be from a lower limit of 1, 2, 3, 4, 5, 6, 7, 8, 9, 10, or 12 wt. % to an upper limit of 4, 5, 6, 7, 8, 9, 10, 12, 14, or 15 wt. % of the weight of the polymer polyol dispersions.

The second step may include a) introducing at least one of the co-reactant to the polymer polyol, and b) introducing the at least one polyisocyanate to create a polymer polyol having a second solid content. In certain embodiments, additional amounts of tin-free catalyst may added in the second step, however it has been found that additional amounts of catalyst may not be needed. The second solid content may be between 2 and 25 wt. % of the total weight of the polymer polyol having a first solid content. All individual values and subranges between 2 wt. % and 25 wt. % are included herein and disclosed herein; for example, the solid content may be from a lower limit of 2, 3, 4, 5, 6, 7, 8, 10, 12, 14, 15, or 20 wt. % to an upper limit of 4, 5, 6, 7, 8, 9, 10, 12, 14, 15, 16, 17, 18, 19, 20, or 25 wt. % of the weight of the polymer polyol dispersions.

All steps may also include stirring the reaction mixture. All methods of stiffing known in the art is contemplated.

In certain embodiments, the second step may be repeated between 1 to 10 times, until a a final polymer polyol having a final solid content is obtained. Alternatively, the second step may be repeated until the final solid content is within the range between 15 wt. % and 50 wt. %. All individual values and subranges between 15 wt. % and 50 wt. % are included herein and disclosed herein; for example, the solid content may be from a lower limit of 15, 16, 17, 18, 19, 20, 25, 30, 35, 40% to an upper limit of 18, 20, 25, 30, 35, 40, 45, or 50% of the weight of the polymer polyol dispersions. It is appreciated that these solids levels are calculated based on the addition of concentrations of seeds, co-reactants and polyisocyanates in the total recipe. Because some of the polymer formed may be soluble in the carrier polyol, in what is known as the serum phase, the measurable level of solid particles may be lower than the theoretical amount by up to 30%, or by less than 20%, or by less than 10%.

In certain embodiments, there may be a time interval between the steps of at least 0.5 minutes.,. By optimizing the time interval between the addition steps, it is possible to minimize both particle size and viscosity. For example the time interval may be at least ½, 1, 5, 15, 30, 45, or 60 minutes. Embodiments may also encompass time intervals of at least 2, 4, 6, 8, 10, 12, 15, 20, 24 or even more hours. In certain embodiments, stirring may be applied during the time interval between steps. All methods of stirring known in the art are contemplated. The PHD or PIPA particle size and particle size distribution may be measured with using any method known in the art. For example, the PHD or PIPA particle size and particle size distribution may be measured with a Beckman Coulter LS230 particle size analyzer with small volume module. The sample of PHD and/or PIPA polyol is first diluted in isopropanol before being measured by light distribution of a laser beam. The bigger the size of the particles, the larger the distribution of the laser light. Several measurements take place during a run to provide a diagram showing volume % with particle size. The dilution with isopropanol is adjusted depending on solids content to optimize the instrument reading. Usually 20 to 30 ml of IPA are used for 0.5 grams of PHD and/or PIPA polyol.

The PHD and/or PIPA polymer polyol dispersion solids may have average particle such that at least 90% by volume of the particles have particle diameters of less than 10 μm as measured in accordance to the Beckman Coulter LS230 analysis.

Embodiments encompass at least 99% by volume of the particles have particle diameters of less than 10 μm. Embodiments also encompass at least 90% by volume of the particles have particle diameters of less than 5 μm. Embodiments also encompass at least 99% by volume of the particles have particle diameters of less than 5 μm. Embodiments also encompass at least 90% by volume of the particles have particle diameters of less than 1 μm. Embodiments also encompass at least 99% by volume of the particles have particle diameters of less than 1 μm.

For a PIPA and/or PHD solid contents of 30%, the viscosity of the resulting polymer polyol dispersion may be less than 14,000, 12,000, 10,000, 8,000, 7,000, 6,000 or 5,000 mPas, measured at 20° C. in accordance with the ISO 3219 method. Another method is the use of cone and plate, with 2 minutes shear ramping program to check the effect of shearing on the particles in suspension in the polyol.

The polymer polyol dispersion may be essentially free of tin. By essentially free of tin is meant any tin compounds present does not substantially contribute to any potential reactivity or other properties of the polymer polyol dispersion. Embodiments also encompass polymer polyol dispersions without any measurable levels of tin compounds, Embodiments encompass tin amount of less than 0.01, 0.02, 0.05, 0.1, 0.5, 1, 2, 3, or 5 ppm. The polymer polyol dispersion prepared from the above ingredients may then be incorporated into a formulation which results in a polyurethane product. The polymer polyol dispersions embodied herein may be used in conjunction with a polyisocyanate such as those mentioned above or may be combined with additional polyols well known in the art, and reacted with a polyisocyanate to form a resulting polyurethane foam product.

In general, the polyurethane foams are prepared by mixing an isocyanate, such as the isocyanates listed above, or combinations thereof, and the polymer polyol in the presence of a blowing agent, catalyst(s) and other optional ingredients as desired. Additional polyols and/or polymer polyols may also be added to the polymer polyol blend before the polymer polyol composition is reacted with the polyisocyanate. The conditions for the reaction are such that the polyisocyanate and polyol composition react to form a polyurethane and/or polyurea polymer while the blowing agent generates a gas that expands the reacting mixture.

The polyol blend may have a total solids content (including seed, PIPA and/or PHD solids) of between about 5 wt. % and about 50 wt. % or more, based on the total mass of the blend. All individual values and subranges between about 5 wt. % and about 50 wt. % are included herein and disclosed herein; for example, the solid content may be from a lower limit of 5, 8, 10, 15, 20, 25, or 30 wt. % to an upper limit of 20, 25, 30, 35, or 40 wt. % of the weight of the blend. In one embodiment the content is between about 8 and 40 wt. %. Additionally fillers, such as mineral fillers, flame retarding agents such as melamine, or recycled foam powder can be incorporated in the polyol blend at levels between 1 and 50% of the polyol blend, or between 2 and 10% of the polyol blend.

The blend may also include one or more catalysts for the reaction of the polyol (and water, if present) with the polyisocyanate. Any suitable urethane catalyst may be used, including tertiary amine compounds, amines with isocyanate reactive groups and organometallic compounds. Exemplary tertiary amine compounds include triethylenediamine, N-methylmorpholine, N,N-dimethylcyclohexylamine, pentamethyldiethylenetriamine, tetramethylethylenediamine, bis (dimethylaminoethyl)ether, 1-methyl-4-dimethylaminoethylpiperazine, 3-methoxy-N-dimethylpropylamine, N-ethylmorpholine, dimethylethanolamine, N-cocomorpholine, N,N-dimethyl-N',N'-dimethyl isopropylpropylenediamine, N,N-diethyl-3-diethylamino-propylamine and dimethylbenzylamine. Exemplary organometallic catalysts include organomercury, organolead, organoferric, organobismuth and organotin catalysts, with no organometallic catalysts being preferred. A catalyst for the trimerization of isocyanates, resulting in a isocyanurate, such as an alkali metal alkoxide may also optionally be employed herein. The amount of amine catalysts can vary from 0.02 to 5 percent in the formulation or organometallic catalysts from 0.001 to 1 percent in the formulation can be used. Another option is the use of autocatalytic polyols, based on tertiary amine initiatiors, replacing the amine catalysts, hence reducing volatile organic compounds in the foam.

Additionally, it may be desirable to employ certain other ingredients in preparing polyurethane polymers. Among these additional ingredients are emulsifiers, silicone surfactants, preservatives, flame retardants, colorants, antioxidants, reinforcing agents, UV stabilizers, etc.

The foam may be formed by the so-called prepolymer method, in which a stoichiometric excess of the polyisocyanate is first reacted with the high equivalent weight polyol(s) to form a prepolymer, which is in a second step reacted with a chain extender and/or water to form the desired foam. Frothing methods may also be suitable. So-called one-shot methods, may also be used. In such one-shot methods, the polyisocyanate and all isocyanate-reactive components are simultaneously brought together and caused to react. Three widely used one-shot methods which are suitable for use herein include slabstock foam processes, high resiliency slabstock foam processes, and molded foam methods.

Slabstock foam may be prepared by mixing the foam ingredients and dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun. The resulting foams are typically from about from about 10 kg/m$^3$ to 80 kg/m$^3$, especially from about 15 kg/m$^3$ to 60 kg/m$^3$, preferably from about 17 kg/m$^3$ to 50 kg/m$^3$ in density.

Slabstock foam formulation may contain from about 0.5 to about 6, preferably about 1 to about 5 parts by weight water per 100 parts by weight of polyol at atmospheric pressure. At reduced pressure or at high altitudes, these levels are reduced. High resilience slabstock (HR slabstock) foam may be made in methods similar to those used to make conventional slabstock foam but using higher equivalent weight polyols. HR slabstock foams are characterized in exhibiting a Ball rebound score of 45% or higher, per ASTM 3574.03. Water levels tend to be from about 1 to about 6, especially from about 2 to about 4 parts per 100 parts by weight of polyols.

Molded foam can be made according to the invention by transferring the reactants (polyol composition including copolyester, polyisocyanate, blowing agent, and surfactant) to a closed mold, made of steel, aluminum or epoxy resin, where the foaming reaction takes place to produce a shaped foam. Either a so-called "cold-molding" process, in which the mold is not preheated significantly above ambient temperatures, or a "hot-molding" process, in which the mold is heated to drive the cure, can be used. Cold-molding processes are preferred to produce high resilience molded foam. Densities for molded foams generally range from 30 to 70 kg/m$^3$.

EXAMPLES

The following examples are provided to illustrate the embodiments of the invention, but are not intended to limit the scope thereof. All parts and percentages are by weight unless otherwise indicated.

The following materials are used:

| | |
|---|---|
| VORANOL* CP 4735 | A glycerine initiated polyoxypropylene polyol having a polyoxyethylene cap, a hydroxyl number in the range of 33 to 38, average molecular weight of 4,700; and a viscosity at 25° C. of 820 cps, available from The Dow Chemical Company. |
| Triethanolamine | 99% pure triethanolamine available from ALDRICH. |
| VORANATE* T-80 | A toluene diisocyanate (80% 2,4-toluene diisocyanate and 20% 2,6-toluene diisocyanate by weight) composition available from The Dow Chemical Company. |
| KOSMOS 54 | A zinc ricinoleate catalyst available from Evonik Industries. |
| METATIN 1230 | A dimethyltin catalyst available from Acima Specialty Chemicals. |

*VORANATE and VORANOL are trademarks of The Dow Chemical Company.

All Polyol viscosities are measured using a cone and plate viscometer at 20° C. Particle size distributions are determined according to the test method described above using a Beckman-Coulter LS 230 laser instrument.

Examples 1-5 and Comparative Example A-C

PIPA polyols of Examples 1-6 and Comparative Example A are made by first preblending catalyst (KOSMOS 54) in triethanolamine. The catalyst and triethanolamine is then combined with polyol (VORANOL CP 4735) under stiffing at 1500 RMP for 60 seconds. In a first step, isocyanate (VORANATE T-80) is added under stiffing at 1500 RPM for 120 seconds. Subsequent steps then include first adding triethanolamine followed by isocyanate and stirring at 1500 RPM for 120 seconds, with the exception of Example 5 which is continuously stirred throughout the step wise addition process. Examples 1-3 and Comparative Example A have a total of six triethanolamine/isocyanate addition steps. Example 4 and 5 have a total of 3 triethanolamine/isocyanate addition steps. Comparative Examples B and C are performed in only one step. The amounts of each component, along with viscosities and particle size distributions are given in Table 1.

For Example 1, there is a 10 minute interval between each step.

For Example 2, there is a 5 minute interval between each step. For Example 3, there is about a 5 minute interval between each step.

For Example 4, there is about a 5 minute interval between each step.

For Example 5, addition steps are performed at 1 minute intervals between each step.

For Comparative Example A, the reaction system is allowed to return to ambient temperature (from elevated temperatures do to the exothermic reaction) between each step.

TABLE 1

| | Example 1 | Example 2 | Example 3 | Example 4 | Example 5 | Comparative Example A | Comparative Example B | Comparative Example C |
|---|---|---|---|---|---|---|---|---|
| Step 1: | | | | | | | | |
| VORANOL CP 4735 | 80 | 80 | 80 | 80 | 80 | 80 | 79.98 | 80 |
| KOSMOS 54 | 1.2 | 2.0 | 0.2 | 2.0 | 0.2 | 1.2 | | 0.1 |
| METATIN 1230 | | | | | | | | 0.02 |
| Triethanolamine | 2.4 | 2.4 | 2.4 | 4.7 | 4.7 | 2.4 | 9.38 | 9.4 |
| VORANATE T-80 | 2.7 | 2.7 | 2.7 | 5.3 | 5.3 | 2.7 | 10.64 | 10.64 |
| Calculated Solid Content | 5.8 | 5.8 | 5.9 | 10.9 | 11.1 | 5.8 | 20.0 | 20.0 |

TABLE 1-continued

|  | Example 1 | Example 2 | Example 3 | Example 4 | Example 5 | Comparative Example A | Comparative Example B | Comparative Example C |
|---|---|---|---|---|---|---|---|---|
| Step 2 |  |  |  |  |  |  |  |  |
| Triethanolamine | 2.4 | 2.4 | 2.4 | 4.7 | 4.7 | 2.4 |  |  |
| VORANATE T-80 | 2.7 | 2.7 | 2.7 | 5.3 | 5.3 | 2.7 |  |  |
| Calculated Solid Content | 11.0 | 10.9 | 11.1 | 19.7 | 20.0 | 11.0 |  |  |
| Step 3 |  |  |  |  |  |  |  |  |
| Triethanolamine | 2.4 | 2.4 | 2.4 | 4.7 | 4.7 | 2.4 |  |  |
| VORANATE T-80 | 2.7 | 2.7 | 2.7 | 5.3 | 5.3 | 2.7 |  |  |
| Calculated Solid Content | 16.5 | 16.3 | 16.7 | 29.5 | 30.0 | 16.5 |  |  |
| Step 4 |  |  |  |  |  |  |  |  |
| Triethanolamine | 2.4 | 2.4 | 2.4 |  |  | 2.4 |  |  |
| VORANATE T-80 | 2.7 | 2.7 | 2.7 |  |  | 2.7 |  |  |
| Calculated Solid Content | 22.0 | 21.8 | 22.2 |  |  | 22.0 |  |  |
| Step 5 |  |  |  |  |  |  |  |  |
| Triethanolamine | 2.4 | 2.4 | 2.4 |  |  | 2.4 |  |  |
| VORANATE T-80 | 2.7 | 2.7 | 2.7 |  |  | 2.7 |  |  |
| Calculated Solid Content | 27.5 | 27.2 | 27.8 |  |  | 27.5 |  |  |
| Step 6 |  |  |  |  |  |  |  |  |
| Triethanolamine | 2.4 | 2.4 | 2.4 |  |  | 2.4 |  |  |
| VORANATE T-80 | 2.7 | 2.7 | 2.7 |  |  | 2.7 |  |  |
| Calculated Solid Content | 33.0 | 32.7 | 33.3 |  |  | 33.0 |  |  |
| PIPA Polyol properties |  |  |  |  |  |  |  |  |
| Completed Viscosity (mPas at 20° C.) | 14000 | 6700 | 14000 | 6900 | 8000 | 123000 | 8000 | 4170 |
| Particle Size |  |  |  |  |  |  |  |  |
| Mean (μm) |  | 0.31 | 7.58 | 0.32 | 2.45 |  | 3.35 | 17.42 |
| Median (μm) |  | 0.23 | 3.89 | 0.20 | 0.38 |  | 2.77 | 8.18 |
| <10% (μm) |  | 0.11 | 0.18 | 0.09 | 0.16 |  | 0.30 | 2.55 |
| <25% (μm) |  | 0.15 | 0.03 | 0.12 | 0.23 |  | 1.98 | 4.04 |
| <50% (μm) |  | 0.23 | 3.89 | 0.20 | 0.38 |  | 2.77 | 8.18 |
| <75% (μm) |  | 0.36 | 10.54 | 0.00 | 2.22 |  | 3.87 | 17.94 |
| <90% (μm) |  | 0.57 | 20.94 | 0.42 | 8.01 |  | 5.61 | 45.72 |

It can be seen from the data that by using a multi-step process, high solid content polymer polyols are obtained while keeping particle diameters small and viscosities low.

While the foregoing is directed to embodiments of the present invention, other and further embodiments of the invention may be devised without departing from the basic scope thereof, and the scope thereof is determined by the claims that follow.

The invention claimed is:

1. A method of producing a polymer polyol dispersion, the method comprising:
   1) in a first step, a) combining at least one of a tin-free catalyst, at least one of a polyol, and at least one of a co-reactant, wherein the co-reactant has an equivalent weight of up to 400 and at least one active hydrogen attached to a nitrogen or oxygen atom, and b) introducing at least one polyisocyanate to create a polymer polyol having a first solid content;
   2) in a second step, a) introducing at least one of a co-reactant to the polymer polyol, wherein the co-reactant has an equivalent weight of up to 400 and at least one active hydrogen attached to a nitrogen or oxygen atom, b) introducing at least one polyisocyanate to create a polymer polyol having a second solid content; and
   repeating the second step at least 1 time until a final polymer polyol having a final solid content is obtained.

2. The method of claim 1, wherein in step 1, the at least one of a tin-free catalyst is combined with the at least one of a co-reactant before being combined with the at least one of a polyol.

3. The method of claim 1, wherein the first solid content is between 1 and 15 wt % based on the total weight of the polymer polyol having a first solid content.

4. The method of claim 3, wherein the second solid content is between 2 and 25 wt % based on the total weight of the polymer polyol having a second solid content.

5. The method of claim 1, wherein the final solid content is between 15 and 50 wt % based on the total weight of the polymer polyol having a final solid content.

6. The method of claim 1, wherein more than 90% by weight of particles in the polymer polyol dispersion has a particle diameter of less than 10 μm.

7. The method of claim 5, wherein more than 90% by weight of particles in the polymer polyol dispersion has a particle diameter of less than 5 μm.

8. The method of claim 6, wherein more than 90% by weight of particles in the polymer polyol dispersion has a particle diameter of less than 1 μm.

9. The method of claim 1, wherein the polymer polyol has a viscosity at 20° C of less than 15000 mPa·s.

10. The method of claim 1, wherein the polymer polyol has a viscosity at 20° C. of less than 9000 mPa·s.

11. The method of claim 1, wherein the co-reactant comprises at least one of a primary or secondary amine or an alkanolamine.

12. The method of claim 11 wherein the tin-free catalyst comprises at least one of a tin-free metal catalyst, a tertiary amine catalyst, or a combination of the tin free metal catalyst and the tertiary amine catalyst.

13. The method of claim 12, wherein the at least one of a tin-free metal catalyst comprises at least one of zinc ricinoleate, zinc octoate, and bismuth neodecanoate.

14. The method of claim 12, wherein the tertiary amine catalyst comprises at least one of triethylenediamine, bis-(dimethylaminopropyl) methylamine, or a combination of both.

15. The method of producing a polymer polyol dispersion of claim 1, wherein the polymer polyol dispersion comprises a polyol liquid phase and solid particle phase, the polymer polyol dispersion is essentially free of tin, has a solid content of between about 20 and 50 wt % based on the total weight of the polymer polyol dispersion, has a viscosity at 20° C. of less than 9000 mPas, and the solid particle phase comprises more than 90% by weight of particles in the solid particle phase having a particle diameter of less than 5 μm.

16. The method of claim 15, wherein the solid particle phase comprises PIPA particles, PHD particles, or a combination of both.

\* \* \* \* \*